US012727001B2

(12) United States Patent
Mao et al.

(10) Patent No.: US 12,727,001 B2
(45) Date of Patent: Sep. 1, 2026

(54) GRANT ADAPTATION FOR REDUCED CAPABILITY USER EQUIPMENT AND 1BIT DOWNLINK CONTROL INFORMATION INDICATION

(71) Applicant: Nokia Technologies Oy, Espoo (FI)

(72) Inventors: Xiaomao Mao, Massy (FR); Rapeepat Ratasuk, Naperville, IL (US); Nitin Mangalvedhe, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 350 days.

(21) Appl. No.: 18/294,282

(22) PCT Filed: Aug. 5, 2022

(86) PCT No.: PCT/FI2022/050515
§ 371 (c)(1),
(2) Date: Feb. 1, 2024

(87) PCT Pub. No.: WO2023/037041
PCT Pub. Date: Mar. 16, 2023

(65) Prior Publication Data

US 2024/0349296 A1 Oct. 17, 2024

Related U.S. Application Data

(60) Provisional application No. 63/242,458, filed on Sep. 9, 2021.

(51) Int. Cl.

| | |
|---|---|
| ***H04W 72/232*** | (2023.01) |
| ***H04L 5/00*** | (2006.01) |
| ***H04W 72/1268*** | (2023.01) |

(52) U.S. Cl.
CPC ......... *H04W 72/232* (2023.01); *H04L 5/0053* (2013.01); *H04W 72/1268* (2013.01)

(58) Field of Classification Search
CPC ............................ H04W 72/04; H04W 72/232
See application file for complete search history.

(56) References Cited

U.S. PATENT DOCUMENTS

2017/0079012 A1* 3/2017 Rashid .............. H04W 56/0005
2019/0191486 A1 6/2019 Myung et al.
(Continued)

FOREIGN PATENT DOCUMENTS

WO 2020/026708 A1 2/2020
WO 2020/217808 A1 10/2020

OTHER PUBLICATIONS

International Search Report and Written Opinion received for corresponding Patent Cooperation Treaty Application No. PCT/FI2022/050515, dated Oct. 25, 2022, 16 pages.
(Continued)

*Primary Examiner* — Elton Williams
(74) *Attorney, Agent, or Firm* — Nokia Technologies Oy

(57) ABSTRACT

Systems, methods, apparatuses, and computer program products for flexibly scheduling RedCap UE using DCI and UCI. One method may include a user equipment receiving first DCI comprising scheduling information associated with at least one of a 5 DL data channel or an UP data channel from a NE, and storing the scheduling information. The UE may further receive second DCI, and based upon the second DCI, at least one of receive the downlink data channel transmit the uplink data channel based on the stored scheduling information.

20 Claims, 7 Drawing Sheets

(56) References Cited

U.S. PATENT DOCUMENTS

| | | | | |
|---|---|---|---|---|
| 2020/0022144 | A1 | 1/2020 | Papasakellariou | |
| 2020/0187239 | A1 | 6/2020 | Khoshnevisan et al. | |
| 2022/0225364 | A1 * | 7/2022 | Aiba | H04W 72/20 |

OTHER PUBLICATIONS

Extended European Search Report received for corresponding European Patent Application No. 22866824.0, dated Jul. 2, 2025, 10 pages.

"Other UE Complexity Reduction Aspects", 3GPP TSG RAN WG1 Meeting #106-e, R1-2106652, Agenda: 8.6.1.4, Nokia, Aug. 16-27, 2021, 3 pages.

"UE Complexity Reduction Aspects Related to Reduced No. of Rx Branches", 3GPP TSG RAN WG1 Meeting #106-e, R1-2106649, Agenda: 8.6.1.2, Nokia, Aug. 16-27, 2021, 6 pages.

"Discussion on other Aspects Related to Complexity Reduction", 3GPP TSG RAN WG1 #105-e, R1-2104529, Agenda: 8.6.1.4, CATT, May 19-27, 2021, 3 pages.

* cited by examiner

FIG. 7

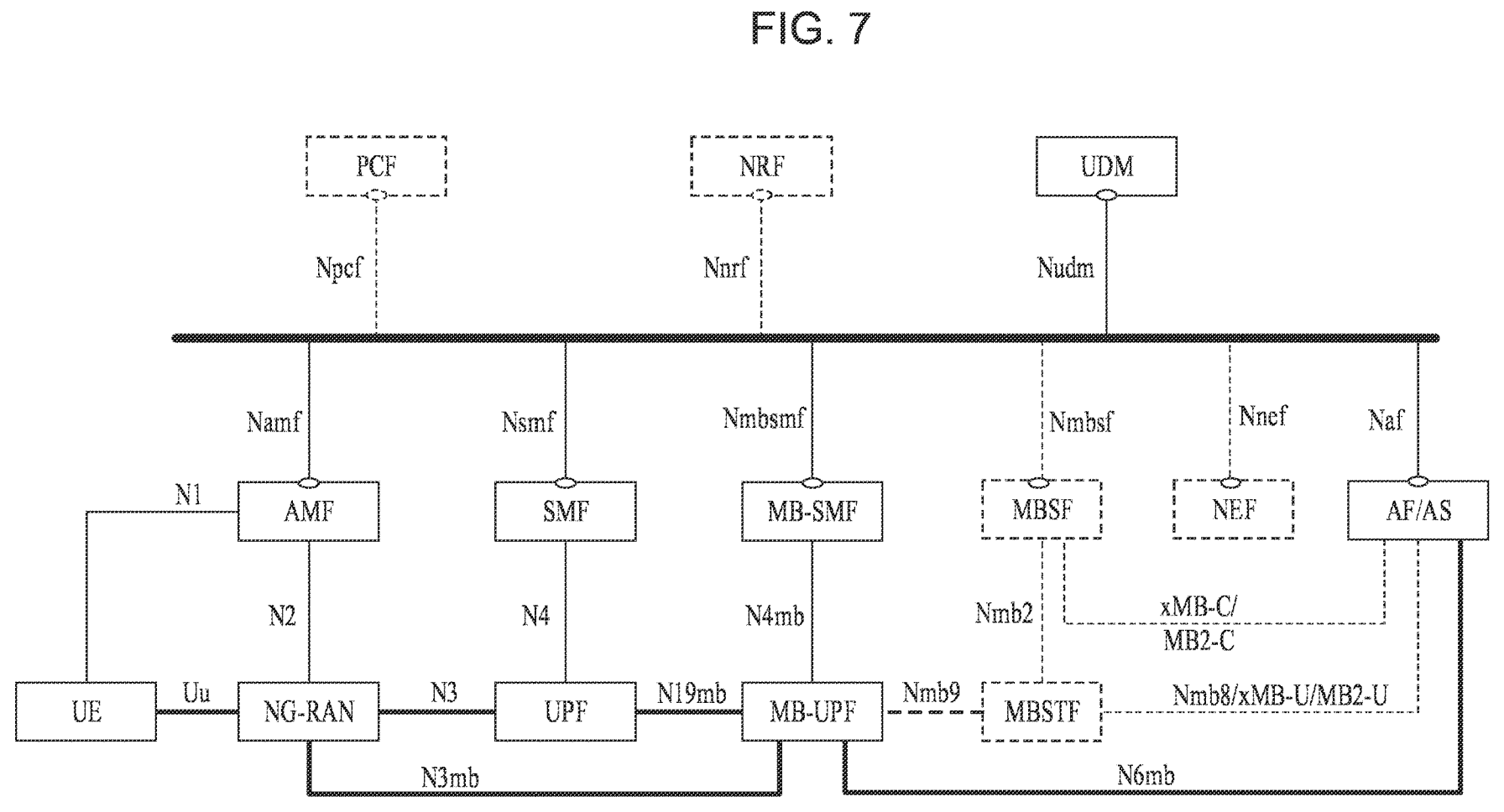

UDM
NRF
PCF
Nudm
Nnrf
Npcf
AF/AS
NEF
MBSF
MB-SMF
SMF
AMF
Naf
Nnef
Nmbsf
Nmbsmf
Nsmf
Namf
N1
xMB-C/
MB2-C
Nmb2
N4mb
N4
N2
Nmb8/xMB-U/MB2-U
MBSTF
Nmb9
MB-UPF
N19mb
UPF
N3
NG-RAN
Uu
UE
N6mb
N3mb

GRANT ADAPTATION FOR REDUCED CAPABILITY USER EQUIPMENT AND 1BIT DOWNLINK CONTROL INFORMATION INDICATION

RELATED APPLICATION

This application was originally filed as PCT Application No. PCT/FI2022/050515, filed on Aug. 5, 2022, which claims priority from U.S. Provisional Application No. 63/242,458, filed Sep. 9, 2021, each of which is incorporated herein by reference in its entirety.

CROSS REFERENCE TO RELATED APPLICATION

This application claims the benefit of U.S. Provisional Application No. 63/242,458, filed Sep. 9, 2021. The entire content of the above-referenced application is hereby incorporated by reference.

TECHNICAL FIELD

Some example embodiments may generally relate to mobile or wireless telecommunication systems, such as Long Term Evolution (LTE), fifth generation (5G) radio access technology (RAT), new radio (NR) access technology, and/or other communications systems. For example, certain example embodiments may relate to systems and/or methods for flexible scheduling reduced capability (RedCap) user equipment (UE) using downlink control information (DCI) and uplink control information (UCI).

BACKGROUND

Examples of mobile or wireless telecommunication systems may include radio frequency (RF) 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine-type communication (mMTC). NR is expected to deliver extreme broadband, ultra-robust, low-latency connectivity, and massive networking to support the Internet of Things (IoT). The next generation radio access network (NG-RAN) represents the RAN for 5G, which may provide radio access for NR, LTE, and LTE-A. It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some example embodiments, a method may include receiving, by a user equipment, first downlink control information comprising scheduling information associated with at least one of a downlink data channel or an uplink data channel from a network entity. The method may further include storing, by the user equipment, the scheduling information. The method may further include receiving, by the user equipment, second downlink control information. The method may further include based upon the second downlink control information, at least one of receiving, by the user equipment, the downlink data channel or transmitting, by the user equipment, the uplink data channel based on the stored scheduling information.

In accordance with certain example embodiments, an apparatus may include means for receiving first downlink control information comprising scheduling information associated with at least one of a downlink data channel or an uplink data channel from a network entity. The apparatus may further include means for storing the scheduling information. The apparatus may further include means for receiving second downlink control information. The apparatus may further include means for, based upon the second downlink control information, at least one of receiving the downlink data channel or transmitting the uplink data channel based on the stored scheduling information.

In accordance with various example embodiments, an apparatus may include at least one processor and at least one memory including computer program code. The at least one memory and the computer program code may be configured to, with the at least one processor, cause the apparatus to at least receive first downlink control information comprising scheduling information associated with at least one of a downlink data channel or an uplink data channel from a network entity. The at least one memory and the computer program code may be further configured to, with the at least one processor, cause the apparatus to at least store the scheduling information. The at least one memory and the computer program code may be further configured to, with the at least one processor, cause the apparatus to at least receive second downlink control information. The at least one memory and the computer program code may be further configured to, with the at least one processor, cause the apparatus to at least, based upon the second downlink control information, at least one of receive the downlink data channel or transmit the uplink data channel based on the stored scheduling information.

In accordance with some example embodiments, a non-transitory computer readable medium may be encoded with instructions that may, when executed in hardware, perform a method. The method may include receiving first downlink control information comprising scheduling information associated with at least one of a downlink data channel or an uplink data channel from a network entity. The method may further include storing the scheduling information. The method may further include receiving second downlink control information. The method may further include, based upon the second downlink control information, at least one of receiving the downlink data channel or transmitting the uplink data channel based on the stored scheduling information.

In accordance with certain example embodiments, a computer program product may perform a method. The method may include receiving first downlink control information comprising scheduling information associated with at least one of a downlink data channel or an uplink data channel from a network entity. The method may further include storing the scheduling information. The method may further include receiving second downlink control information. The method may further include, based upon the second downlink control information, at least one of receiving the downlink data channel or transmitting the uplink data channel based on the stored scheduling information.

In accordance with various example embodiments, an apparatus may include circuitry configured to receive first downlink control information comprising scheduling information associated with at least one of a downlink data channel or an uplink data channel from a network entity. The circuitry may further be configured to store the scheduling information. The circuitry may further be configured to receive second downlink control information. The circuitry may further be configured to, based upon the second downlink control information, at least one of receiving the downlink data channel or transmitting the uplink data channel based on the stored scheduling information.

In accordance with some example embodiments, a method may include transmitting, by a network entity, a first downlink control information to a user equipment configured to schedule a grant. The method may further include determining, by the network entity, whether or not to update the grant for the user equipment. The method may further include transmitting, by the network entity, a second downlink control information to the user equipment in response to determining to update the grant. The method may further include transmitting, by the network entity, a third downlink control information to the user equipment in response to determining to not update the grant.

In accordance with certain example embodiments, an apparatus may include means for transmitting a first downlink control information to a user equipment configured to schedule a grant. The apparatus may further include means for determining whether or not to update the grant for the user equipment. The apparatus may further include means for transmitting a second downlink control information to the user equipment in response to determining to update the grant. The apparatus may further include means for transmitting a third downlink control information to the user equipment in response to determining to not update the grant.

In accordance with various example embodiments, an apparatus may include at least one processor and at least one memory including computer program code. The at least one memory and the computer program code may be configured to, with the at least one processor, cause the apparatus to at least transmit a first downlink control information to a user equipment configured to schedule a grant. The at least one memory and the computer program code may be further configured to, with the at least one processor, cause the apparatus to at least determine whether or not to update the grant for the user equipment. The at least one memory and the computer program code may be further configured to, with the at least one processor, cause the apparatus to at least transmit a second downlink control information to the user equipment in response to determining to update the grant. The at least one memory and the computer program code may be further configured to, with the at least one processor, cause the apparatus to at least transmit a third downlink control information to the user equipment in response to determining to not update the grant.

In accordance with some example embodiments, a non-transitory computer readable medium may be encoded with instructions that may, when executed in hardware, perform a method. The method may include transmitting a first downlink control information to a user equipment configured to schedule a grant. The method may further include determining whether or not to update the grant for the user equipment. The method may further include transmitting a second downlink control information to the user equipment in response to determining to update the grant. The method may further include transmitting a third downlink control information to the user equipment in response to determining to not update the grant.

In accordance with certain example embodiments, a computer program product may perform a method. The method may include transmitting a first downlink control information to a user equipment configured to schedule a grant. The method may further include determining whether or not to update the grant for the user equipment. The method may further include transmitting a second downlink control information to the user equipment in response to determining to update the grant. The method may further include transmitting a third downlink control information to the user equipment in response to determining to not update the grant.

In accordance with various example embodiments, an apparatus may include circuitry configured to transmit a first downlink control information to a user equipment configured to schedule a grant. The circuitry may further be configured to determine whether or not to update the grant for the user equipment. The circuitry may further be configured to transmit a second downlink control information to the user equipment in response to determining to update the grant. The circuitry may further be configured to transmit a third downlink control information to the user equipment in response to determining to not update the grant.

BRIEF DESCRIPTION OF THE DRAWINGS

For proper understanding of example embodiments, reference should be made to the accompanying drawings, wherein:

FIG. 7 illustrates an example of a 5G network and system architecture according to certain example embodiments.

DETAILED DESCRIPTION

Figure 1:
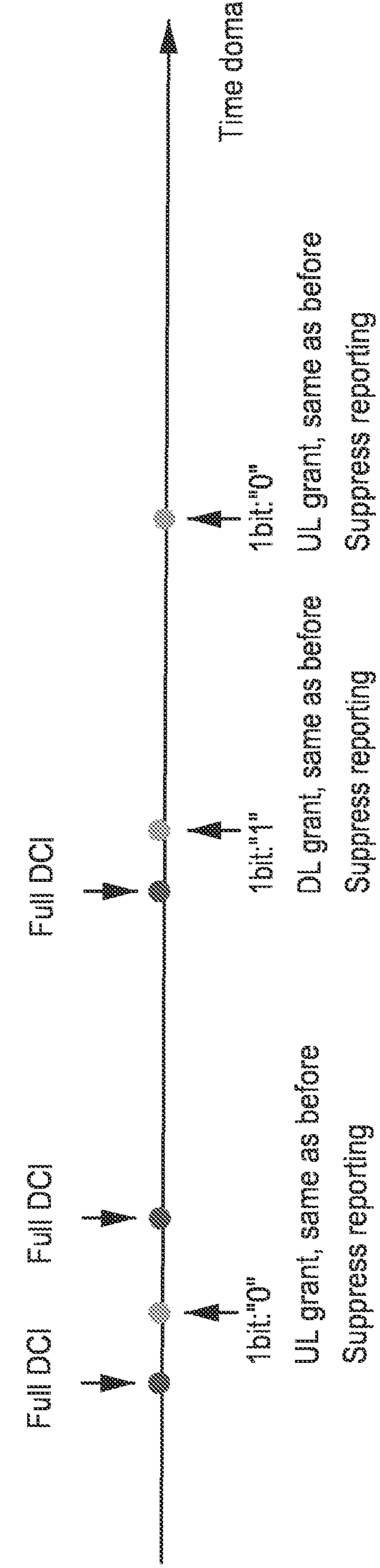
FIG. 1 illustrates an example of a grant update with a full DCI according to various example embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for flexibly scheduling RedCap UE using DCI and UCI.

In general, RedCap UEs may have minimal movement or be static (i.e., low or no mobility), and may only have a few alternating traffic patterns. In Third Generation Partnership Project (3GPP), the base station may schedule a non-RedCap UE using dynamic and/or configured scheduling. However, challenges remain to flexibly schedule RedCap UEs without increasing overhead.

For dynamic scheduling, 3GPP Rel-16 introduced configurable DCI formats (format 0_2 for UL, and format 1_2 for DL) to address physical downlink control channel (PDCCH) blocking issues in ultra-reliable and low-latency communication (URLLC) scenarios. By using configurable fields, the configured DCI format may only include necessary fields, and may preserve a size smaller compared to fallback DCI, enabling a base station to achieve a higher PDCCH capacity using the dynamic grants with limited PDCCH resources; as a result, with smaller-sized DCI, more DCI can be provided in fixed PDCCH resources. For the configured scheduling, existing semi-persistent scheduling (SPS) for DL, and configured grants for UL, may be improved. In particular, scheduling grants may be predefined in radio resource control (RRC) messages with a fixed periodicity. Once the feature is enabled, the UE may follow the periodicity, and may transmit or receive according to the scheduling information in the predefined grant.

While configurable DCI formats may be beneficial to use for RedCap UEs when using dynamic scheduling, this was originally designed for URLLC scenarios. Specifically, configurable DCI formats do not take advantage of RedCap UE characteristics when optimizing the DCI formats for RedCap UEs, and instead includes fields associated with mobility-related scheduling decisions even when RedCap UEs have limited mobility. For example, the 5-bit modulation and coding scheme (MCS) field (for configurable DCI formats) value typically changes based on UE mobility. Since RedCap UEs have minimal or no mobility, base stations may schedule v UEs with the same or similar grants, and may repeatedly signal the same MCS to the RedCap UEs, creating unnecessary overhead costs.

The use of configured scheduling may avoid unnecessary signaling to RedCap UEs using the same MCS, thereby wasting power by repeatedly decoding the same information. However, configured scheduling grants may be predefined in RRC messages, and due to a preconfigured periodicity, may have limited adaptivity to RedCap UE scenarios. For example, configured scheduling grants may not be derived based on real UE channels, and periodicities may not be adjusted according to UE traffic patterns. If configured scheduling is used, when the RedCap UE moves to another location or switches traffic patterns, there may be performance degradation unless a RRC reconfiguration is performed, which may be very expensive in terms of both signaling overhead and latency.

Certain example embodiments described herein may have various benefits and/or advantages to overcome the disadvantages described above. For example, certain example embodiments may avoid repeatedly transmitting the same grant or the same scheduling information for RedCap UEs that have minimal movement and/or fixed traffic patterns. In addition, some example embodiments may provide appropriate flexibility and adaptivity for RedCap UEs that move and/or switch traffic patterns. Thus, certain example embodiments discussed below are directed to improvements in computer-related technology.

Figure 2:
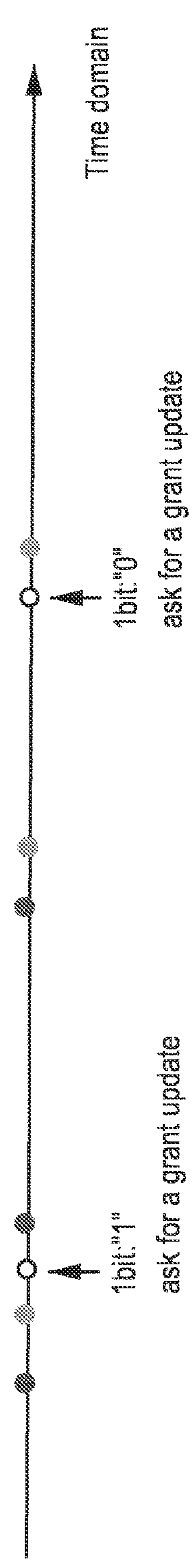
FIG. 2 illustrates an example of a request grant update with one-bit UCI according to some example embodiments.

As illustrated in FIG. 1, some example embodiments discussed herein may relate to a new scheduling mechanism that bridges dynamic scheduling and configured scheduling for RedCap UE scenarios having minimal mobility and/or variable traffic patterns. Since RedCap UEs may be characterized by low mobility and only a few traffic patterns, RedCap UEs may be scheduled by a grant update using DCI, where the updating may be on-demand. A RedCap UE may be scheduled with a grant using a full DCI at the beginning, and then using a lean, one-bit DCI if the same grant applies. If the base station decides to schedule a RedCap UE with a different grant, the base station may send another full DCI to update the grant. By sending a one-bit DCI, the base station may relieve the RedCap UE from usual reporting, which may include channel state information (CSI), power head room (PHR). Instead, lean reporting configured in a RRC message may be activated until the base station provides an indication for resumption of the usual reporting by sending the full DCI. Alternatively, as shown in FIG. 2, the RedCap UE may send a request using one bit in UCI if the RedCap UE requires a grant update and/or if the RedCap UE prefers to continue usual reporting when traffic patterns and/or channel conditions change. Nevertheless, the base station may decide whether and when to update the grant. Some example embodiments may need only minor modifications to current 3GPP standards, and may provide a scheduling method tailored for RedCap UEs. Thus, according to certain example embodiments, it may be possible to provide a trade-off between overhead reduction and scheduling flexibility for RedCap UEs, and provide benefits for UE power saving and complexity reduction.

In some embodiments, a time window may be implemented to measure the stableness of UE CSI reporting. When UE reporting is stable throughout the time window (e.g., the reported values don't change much, or the variation is below a threshold), the base station may switch to the lean one-bit DCI to schedule the UE. Once a scheduling request is received from the UE, the base station may check the stableness of the UE reporting or if there is any grant update request received. If the UE reporting is stable and/or if there is no grant update request, the base station scheduler may add the UE to the pre-scheduling list, reserve the time-frequency resources as previously scheduled for the UE, and skip the time domain and frequency domain resource assignment for that UE. Alternatively, the base station scheduler may instead put the UE through the time domain and frequency domain resource assignment, refresh the scheduling decision, and schedule to transmit a full DCI to the UE to update the grant.

Various example embodiments may measure the stableness of UE reporting besides time window and thresholding based methods to trigger the base station to transmit a full DCI transmission for the UE. For example, the LMF (positioning function) may report the UE position to update the base station. If the UE moves to a new position far from its previous position, it may be possible that the UE channel changes. As a result, full CSI reporting as well as a grant update, may be needed to follow the changes in UE channels, requiring a new signaling between LMF and base station to communicate the UE position update.

Figure 3:
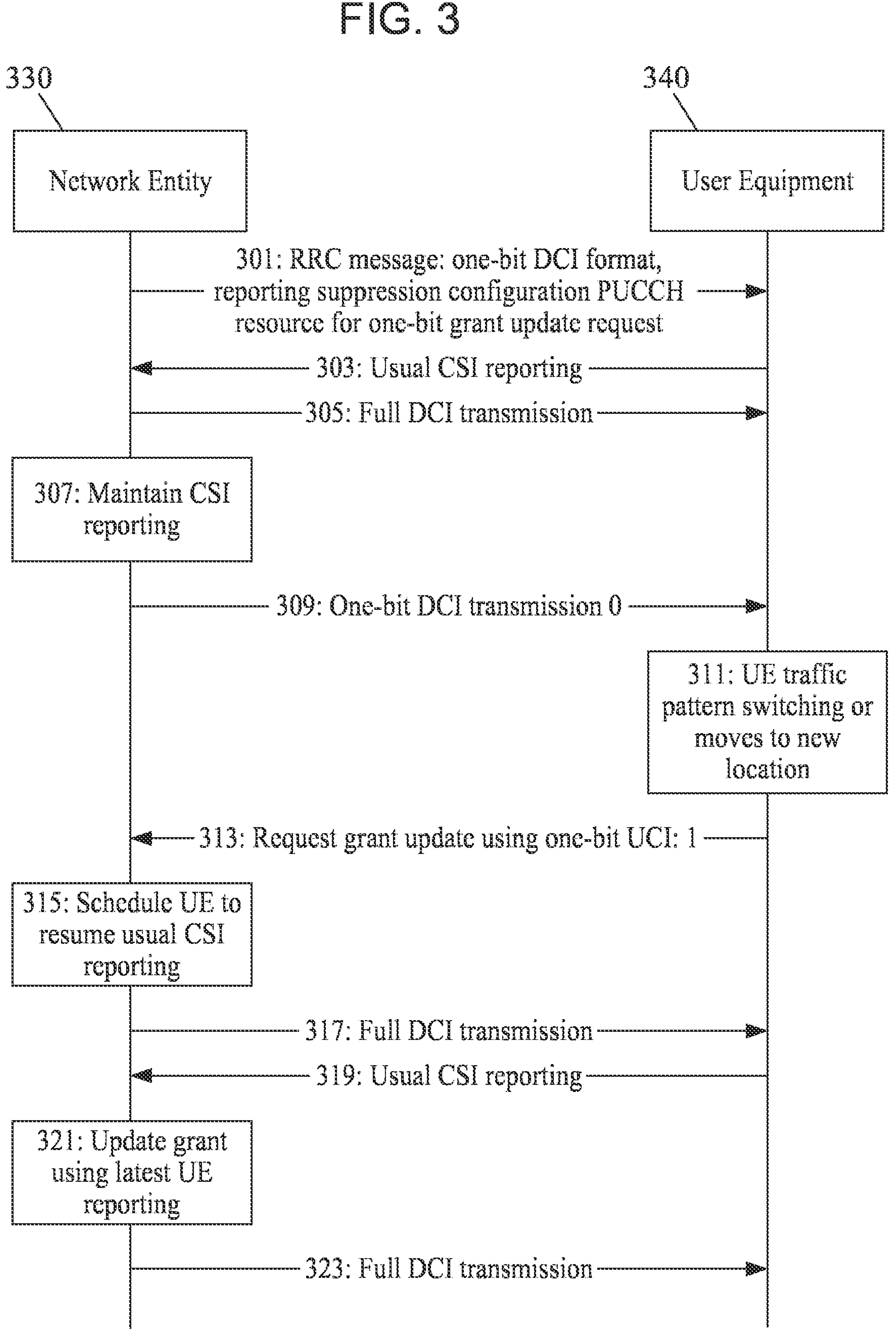
FIG. 3 illustrates an example of a signaling diagram according to certain example embodiments.
Figure 6:
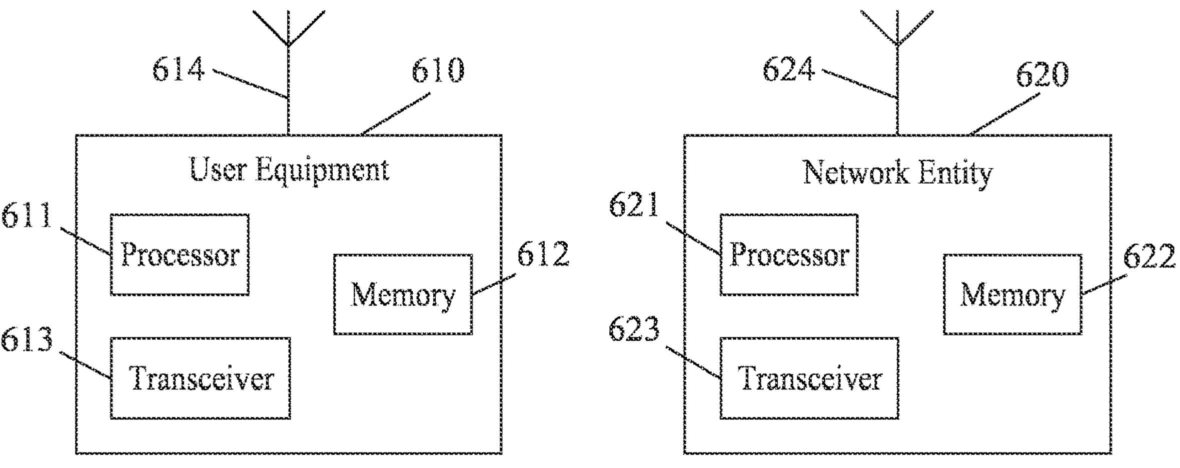
FIG. 6 illustrates an example of various network devices according to some example embodiments.

FIG. 3 illustrates an example of a signaling diagram depicting how to flexibly schedule RedCap UE. NE 330 and UE 340 may be similar to NE 620 and UE 610, respectively, as illustrated in FIG. 6, according to certain example embodiments.

At 301, NE 330 may transmit to UE 340 an RRC message, which may include a configuration for a one-bit DCI format. The RRC message may also include reporting suppression configuration associated with the one-bit DCI and/or PUCCH resources for a one-bit grant update request. For example, UE 340 may be configured in RRC configuration with a full DCI format and/or a one-bit DCI format. There may also be a fallback DCI format for initial RRC connection building and fallback cases. At 303, UE 340 may transmit to NE 330 usual CSI reporting.

At 305, NE 330 may transmit to UE 340 a full DCI transmission, which UE 340 may store in its memory, and may follow the scheduling information in the DCI to transmit or receive. Additionally or alternatively, UE 340 may report "as usual," by reporting as configured in RRC configuration, enabled by MAC-CE, and indicated in the DCI.

In certain example embodiments, UE 340 may be configured via RRC signalling whether or not a full DCI transmission would revert the "usual" UE reporting if the full DCI transmission follows a one-bit DCI, and the full DCI is associated with a retransmission. At 307, NE 330 may maintain usual CSI reporting.

At 309, NE 330 may transmit to UE 340 a one-bit DCI transmission ("0"). In various example embodiments, when UE 340 receives a one-bit DCI indication of "0" (for UL scheduling, so UE 340 transmits) or "1" (for DL scheduling, so UE 340 receives), UE 340 may use the scheduling information in its memory to transmit or receive with certain field-defined exceptions. For example, NDI may be toggled, indicating that when one-bit DCI is indicated, UE 340 should always assume new transmissions. In addition, transmit power control (TPC) may be set to a parameter (e.g., 0), indicating that when one-bit DCI is indicated, UE 340 may always assumes no power adjustment, and UE 340 may transmit with the same power as previous for UL channels.

At 311, UE 340 may experience a traffic pattern switching and/or move to a new location. For example, when UE 340 receives a one-bit DCI indication of "0" (for UL scheduling, so UE 340 transmits) or "1" (for DL scheduling, so UE 340 receives), UE 340 may stop its "usual" reporting, i.e., stopping any reporting, including CSI reporting, PHR, etc. that are configured by RRC message, enabled by MAC-CE, or indicated in DCI. Additionally or alternatively, when UE 340 receives a one-bit DCI, UE 340 may stop reporting those enabled by MAC-CE and/or indicated in DCI, but may continue lean, periodic reporting, configured in RRC configuration, which may include the minimum necessary reporting.

In various example embodiments, when UE 340 receives a one-bit DCI, UE 340 may stop at least one selected (as configured in RRC) reporting (e.g., CQI/RI/PMI reporting) and/or may continue reporting them with extended cycles as configured, e.g., for NE 330 to verify validity of the grant. As a result, UE 340 may be configured with a second reporting configuration, and may switch from the first reporting configuration (associated with a full DCI), comprising the "usual" reporting, to a second reporting configuration (associated with a one-bit DCI). Additionally or alternatively, the suppression of the "usual" reporting may differ for UL and DL cases. For example, for a fixed position RedCap UE, the suppression may be configured for PHR reporting, but the buffer status report (BSR) reporting may be kept for UL, while for the DL, all CSI reporting may be suppressed once the one-bit DCI is received.

At 313, UE 340 may transmit to NE 330 a grant update request using one-bit UCI ("1") carried on PUCCH. For example, if UE 340 supports grant update scheduling, and NE 330 has enabled UE 340 for the feature by configuring one-bit DCI in RRC configuration, NE 330 may allocate the PUCCH resource for grant update request transmission for the UE 340. UE 340 may also utilize one bit to request a grant update, by which UE 340 requests to resume "usual" reporting and a full DCI transmission from NE 330 to update the grant. This may occur when UE 340 determines that the previous reporting is obsolete as it moves to a new location, or UE 340 is going to switch its traffic pattern. When the one-bit request is "0" or "1", UE 340 may request NE 330 to update the UL grant or DL scheduling information, accordingly.

At 315, NE 330 may schedule UE 340 to resume usual CSI reporting. For example, in response to receiving the grant update request at 313, NE 330 may consider it together with the latest UE reporting to decide whether or not to enable UE 340 to resume the "usual" reporting or transmit a full DCI to let UE 340 update the grant in its memory.

At 317, NE 330 may transmit to UE 340 a full DCI transmission. At 319, UE 340 may transmit to NE 330 usual CSI reporting. At 321, NE 330 may update a grant using the latest UE reporting. At 323, NE 330 may transmit to UE 340 a full DCI transmission.

Figure 4:
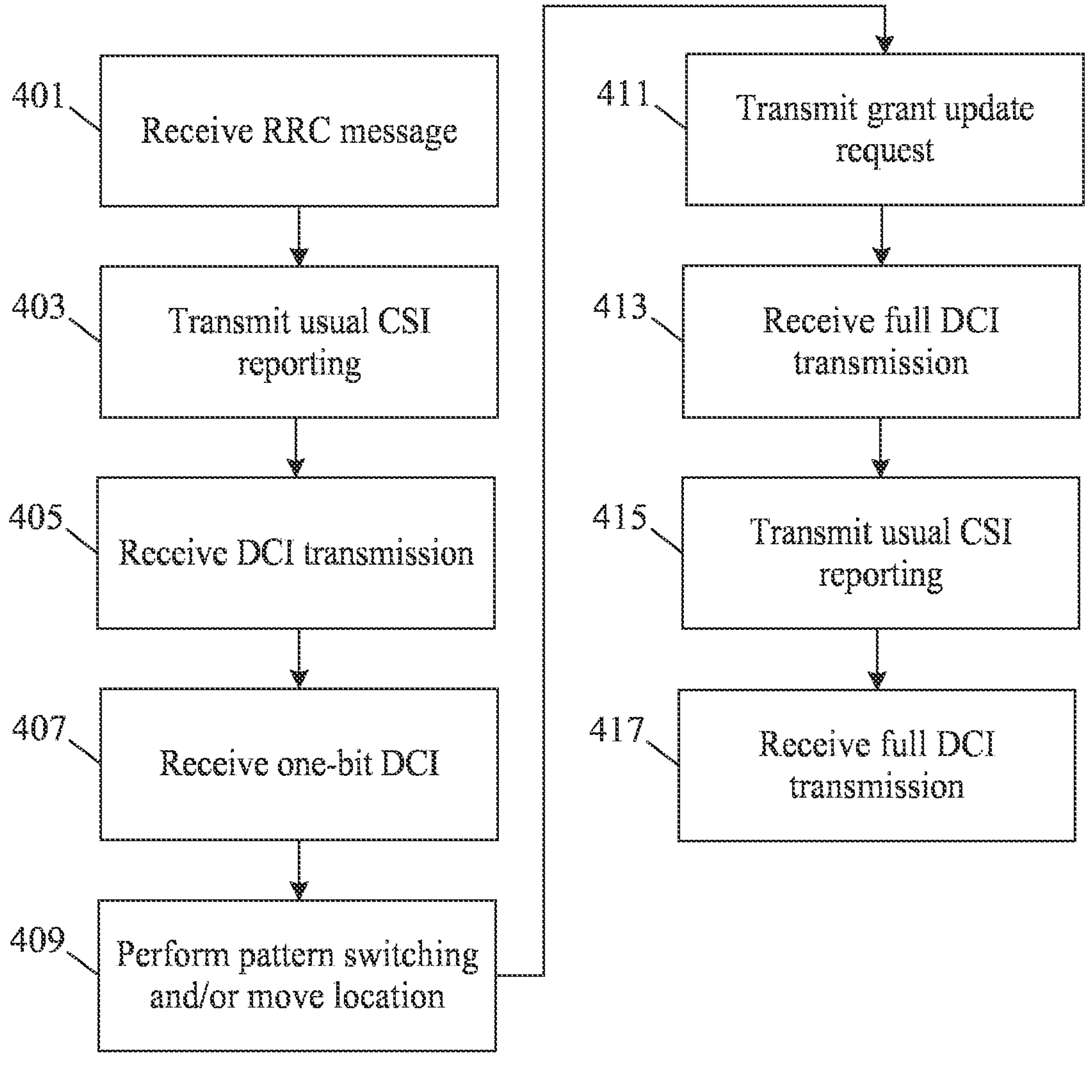
FIG. 4 illustrates an example of a flow diagram of a method according to various example embodiments.

FIG. 4 illustrates an example of a flow diagram of a method that may be performed by a UE, such as UE 610 illustrated in FIG. 6, according to various example embodiments.

At 401, the UE may receive from a NE (which may be similar to NE 620 in FIG. 6) an RRC message, which may include a configuration for a one-bit DCI format. The RRC message may also include reporting suppression configuration associated with the one-bit DCI and/or PUCCH resources for a one-bit grant update request. For example, the UE may be configured in RRC configuration with a full DCI format and/or a one-bit DCI format. There may also be a fallback DCI format for initial RRC connection building and fallback cases. At 403, the method may include transmitting to the NE usual CSI reporting.

At 405, the method may include receiving from the NE a full DCI transmission. The UE may store the DCI information in its memory, and may follow the scheduling information in the DCI to transmit or receive. Additionally or alternatively, the UE may report "as usual," by reporting as configured in RRC configuration, enabled by MAC-CE, and indicated in the DCI. In certain example embodiments, the UE may be configured in RRC whether or not a full DCI transmission would cause the UE to turn revert to the "usual" UE reporting if the full DCI transmission follows a one-bit DCI, and the full DCI is associated with a retransmission.

At 407, the method may include receiving from the NE a one-bit DCI transmission ("0"). In various example embodiments, when the UE receives a one-bit DCI indication of "0" (for UL scheduling, so the UE transmits) or "1" (for DL scheduling, so the UE receives), the UE may use the scheduling information in its memory to transmit or receive with certain field-defined exceptions. For example, NDI may be toggled, indicating that when one-bit DCI is indicated, the UE should always assume new transmissions. In addition, TPC may be set to a parameter (e.g., 0), indicating that when one-bit DCI is indicated, the UE may always assume no power adjustment, and the UE may transmit with the same power as previous for UL channels.

At 409, the method may include performing pattern switching and/or move to a new location. For example, when the UE receives a one-bit DCI indication of "0" (for UL scheduling, so the UE transmits) or "1" (for DL scheduling, so the UE receives), the UE may stop its "usual" reporting, i.e., stopping any reporting, including CSI reporting and PHR, configured by RRC message, enabled by MAC-CE, or indicated in DCI, associated with the one-bit DCI configured in the RRC message. Additionally or alternatively, when the UE receives a one-bit DCI, the UE may stop reporting those enabled by MAC-CE and/or indicated in DCI, but continues periodic reporting, the lean reporting, configured in RRC configuration, which may include the minimum necessary reporting.

In various example embodiments, when the UE receives a one-bit DCI, the UE may stop at least one selected (as configured in RRC) reporting (e.g., CQI/RI/PMI reporting) and/or may continue reporting them with extended cycles as configured, just for the NE to verify validity of the grant. As a result, the UE may be configured with a second reporting configuration, and may switch from the first reporting configuration (associated with a full DCI) to a second reporting configuration (associated with a one-bit DCI). Additionally or alternatively, the suppression of the "usual" reporting may differ for UL and DL cases. For example, for a fixed position RedCap UE, the suppression may be configured for PHR reporting, but the BSR reporting may be kept for UL, while for the DL, all CSI reporting may be suppressed once the one-bit DCI is received.

At 411, the method may include transmitting to the NE a grant update request using one-bit UCI ("1") carried on PUCCH. For example, if the UE supports grant update scheduling, and the NE has enabled the UE for the feature by configuring one-bit DCI in RRC configuration, the NE may allocate the PUCCH resource for grant update request transmission from the UE. The UE may also indicate one-bit to request the grant update, by which the UE requests to resume "usual" reporting and a full DCI transmission from the NE to update the grant. This may occur when the UE determines that the previous reporting is obsolete as it moves to a new location, or the UE is going to switch its traffic pattern. When the one-bit request is "0" or "1", the UE may request the NE to update accordingly the UL grant or DL scheduling information.

At 413, the method may include receiving from the NE a full DCI transmission. At 415, the method may include transmitting to the NE usual CSI reporting. At 417, the method may include receiving from the NE a full DCI transmission.

Figure 5:
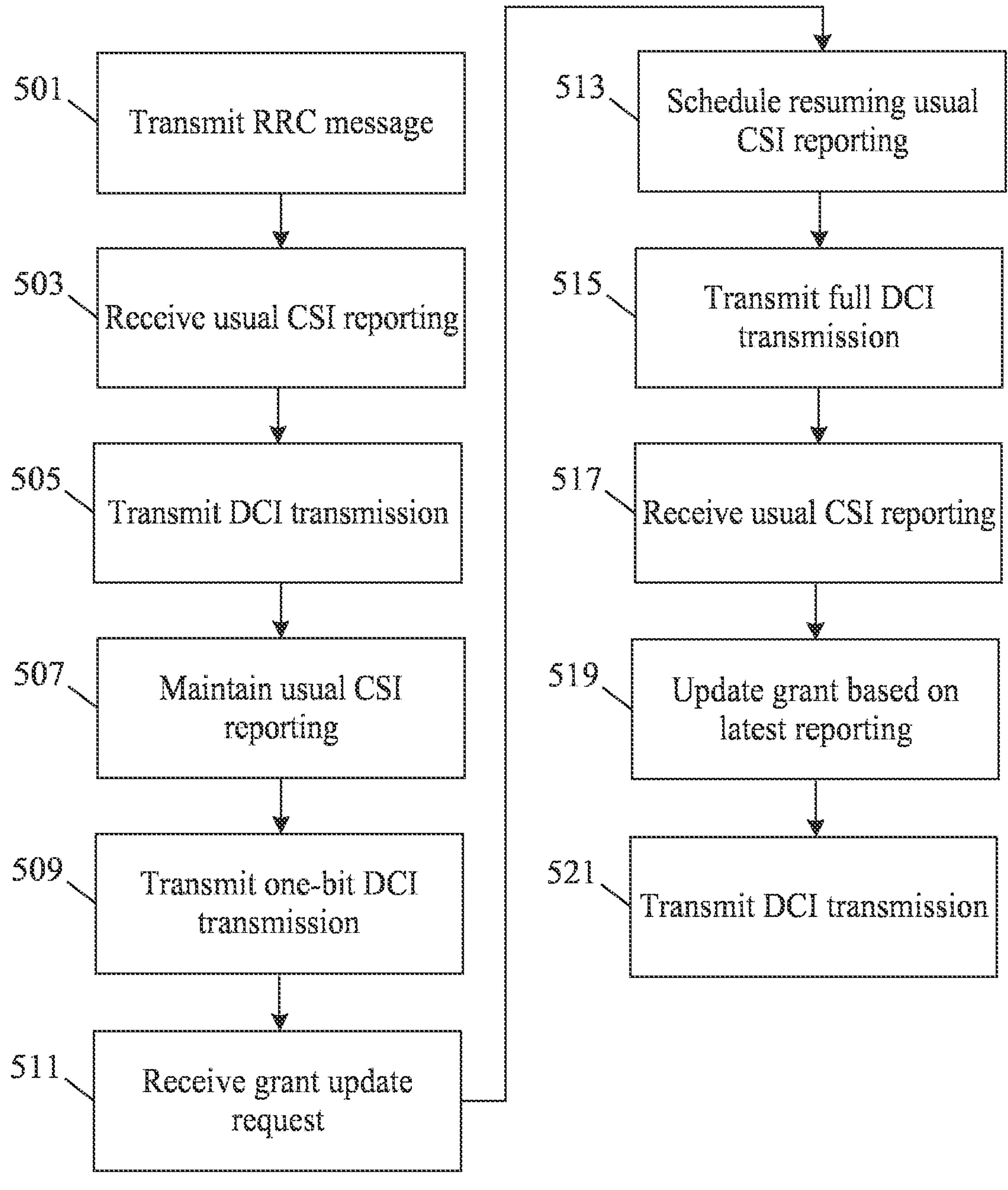
FIG. 5 illustrates an example of another flow diagram of a method according to various example embodiments.

FIG. 5 illustrates an example of a flow diagram of a method that may be performed by a NE, such as NE 620 illustrated in FIG. 6, according to various example embodiments. At 501, the NE may transmit to a UE (which may be similar to UE 610 in FIG. 6) an RRC message, which may include a one-bit DCI format. The RRC message may be associated with reporting suppression configuration PUCCH resources for a one-bit grant update request. For example, the UE may be configured in RRC configuration with a full DCI format and/or a one-bit DCI format. There may also be a fallback DCI format for initial RRC connection building and fallback cases. At 503, the method may further include receiving from the UE usual CSI reporting.

At 505, the method may further include transmitting to the UE a full DCI transmission. The UE may store the DCI information in its memory, and may follow the scheduling information in the DCI to transmit or receive. At 507, the method may further include maintaining usual CSI reporting.

At 509, the method may further include transmitting to the UE a one-bit DCI transmission ("0"). In various example embodiments, when the UE receives a one-bit DCI indication of "0" (for UL scheduling, so the UE transmits) or "1" (for DL scheduling, so the UE receives), the UE may use the scheduling information in its memory to transmit or receive with certain field-defined exceptions. For example, NDI may be toggled, indicating that when one-bit DCI is indicated, the UE should always assume new transmissions. In addition, TPC may be set to a parameter (e.g., 0), indicating that when one-bit DCI is indicated, the UE may always assume no power adjustment, and the UE may transmit with the same power as previous for UL channels.

At 511, the method may further include receiving from the UE a grant update request using one-bit UCI ("1") carried on PUCCH. For example, if the UE supports grant update scheduling, and the NE has enabled the UE for the feature by configuring one-bit DCI in RRC configuration, the NE may allocate the PUCCH resource for grant update request transmission from the UE. The UE may also indicate one-bit to request the grant update, by which the UE requests to resume "usual" reporting and a full DCI transmission from the NE to update the grant. This may occur when the UE determines that the previous reporting is obsolete as it moves to a new location, or the UE is going to switch its traffic pattern. When the one-bit request is "0" or "1", the UE may request the NE to update accordingly the UL grant or DL scheduling information.

At 513, the method may further include scheduling the UE to resume usual CSI reporting. For example, in response to receiving the grant update request at 511, the NE may consider it together with the latest UE reporting to decide whether or not to enable the UE to resume the "usual" reporting or transmit a full DCI to let the UE update the grant in its memory.

At 515, the method may further include transmitting to the UE a full DCI transmission. At 517, the method may further include receiving from the UE usual CSI reporting. At 519, the method may further include updating a grant using the latest UE reporting. At 521, the method may further include transmitting to the UE a full DCI transmission.

FIG. 6 illustrates an example of a system according to certain example embodiments. In one example embodiment, a system may include multiple devices, such as, for example, UE 610 and/or NE 620.

UE 610 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

NE 620 may be one or more of a base station, such as an eNB or gNB, a serving gateway, a server, and/or any other access node or combination thereof. Furthermore, UE 610 and/or NE 620 may be one or more of a citizens broadband radio service device (CBSD).

NE 620 may further comprise at least one gNB-CU, which may be associated with at least one gNB-DU. The at least one gNB-CU and the at least one gNB-DU may be in communication via at least one F1 interface, at least one $X_n$—C interface, and/or at least one NG interface via a 5GC.

UE 610 and/or NE 620 may include at least one processor, respectively indicated as 611 and 621. Processors 611 and 621 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 612 and 622. The memory may be fixed or removable. The memory may include computer program instructions or computer code contained therein. Memories 612 and 622 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 611 and 621, memories 612 and 622, and any subset thereof, may be configured to provide means corresponding to the various blocks of FIGS. 3-5. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 6, transceivers 613 and 623 may be provided, and one or more devices may also include at least one antenna, respectively illustrated as 614 and 624. The device may have many antennas, such as an array of antennas configured for multiple input multiple output (MIMO) communications, or multiple antennas for multiple RATs. Other configurations of these devices, for example, may be provided. Transceivers 613 and 623 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 3-5). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 3-5. For example, circuitry may be hardware-only circuit implementations, such as analog and/or digital circuitry. In another example, circuitry may be a combination of hardware circuits and software, such as a combination of analog and/or digital hardware circuitry with software or firmware, and/or any portions of hardware processors with software (including digital signal processors), software, and at least one memory that work together to cause an apparatus to perform various processes or functions. In yet another example, circuitry may be hardware circuitry and or processors, such as a microprocessor or a portion of a microprocessor, that includes software, such as firmware, for operation. Software in circuitry may not be present when it is not needed for the operation of the hardware.

FIG. 7 illustrates an example of a 5G network and system architecture according to certain example embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 7 may be similar to UE 610 and NE 620, respectively. The user plane function (UPF) may provide services such as intra-RAT and inter-RAT mobility, routing and forwarding of data packets, inspection of packets, user plane quality of service (QOS) processing, buffering of downlink packets, and/or triggering of downlink data notifications. The application function (AF) may primarily interface with the core network to facilitate application usage of traffic routing and interact with the policy framework.

According to certain example embodiments, processor 611 and memory 612 may be included in or may form a part of processing circuitry or control circuitry. In addition, in some example embodiments, transceiver 613 may be included in or may form a part of transceiving circuitry.

For instance, in certain example embodiments, apparatus 610 may be controlled by memory 612 and processor 611 to receive a one-bit downlink control information transmission from a network entity, transmit a grant update request using one-bit uplink control information carried on physical uplink control channel, and receive a full downlink control information transmission.

In various example embodiments, apparatus 620 may be controlled by memory 622 and processor 621 to receive a one-bit downlink control information transmission from a network entity, transmit a grant update request using one-bit uplink control information carried on physical uplink control channel, and receive a full downlink control information transmission.

In some example embodiments, an apparatus (e.g., UE 610 and/or NE 620) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for flexibly scheduling RedCap UE using DCI and UCI.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

PARTIAL GLOSSARY

3GPP Third Generation Partnership Project
5G Fifth Generation
5GC Fifth Generation Core 5GS Fifth Generation System
AMF Access and Mobility Management Function
ASIC Application Specific Integrated Circuit
BS Base Station
BSR Buffer Status Report
CBSD Citizens Broadband Radio Service Device
CN Core Network
CPU Central Processing Unit
CQI Channel Quality Indicator
CSI Channel Station Information
CU Centralized Unit
DCI Downlink Control Information
DL Downlink
eMBB Enhanced Mobile Broadband
eMTC Enhanced Machine Type Communication
eNB Evolved Node B
eOLLA Enhanced Outer Loop Link Adaptation
EPS Evolved Packet System
gNB Next Generation Node B
GPS Global Positioning System
HDD Hard Disk Drive
LMF Location Management Function
LTE Long-Term Evolution
LTE-A Long-Term Evolution Advanced
MAC Medium Access Control
MAC-CE Medium Access Control Control Element
MCS Modulation and Coding Scheme
MEMS Micro Electrical Mechanical System
MIMO Multiple Input Multiple Output
MME Mobility Management Entity
mMTC Massive Machine Type Communication
MPDCCH Machine Type Communication Physical Downlink Control Channel
MTC Machine Type Communication
NAS Non-Access Stratum
NB-IoT Narrowband Internet of Things
NDI New Data Indicator
NE Network Entity
NG Next Generation
NG-eNB Next Generation Evolved Node B
NG-RAN Next Generation Radio Access Network
NR New Radio
NR-U New Radio Unlicensed
OFDM Orthogonal Frequency Division Multiplexing
PDA Personal Digital Assistance
PDCCH Physical Downlink Control Channel
PDSCH Physical Downlink Shared Channel
PHR Power Head Room
PHY Physical
PMI Precoding Matrix Indicator
PRACH Physical Random Access Channel
PUCCH Physical Uplink Control Channel
PUSCH Physical Uplink Shared Channel
RAM Random Access Memory
RAN Radio Access Network
RAT Radio Access Technology
RE Resource Element
RedCap Reduced Capability
RI Rank Indicator
RLC Radio Link Control
RRC Radio Resource Control
SPS Semi-Persistent Scheduling
TPC Transmit Power Control
UCI Uplink Control Information
UE User Equipment
UL Uplink
UMTS Universal Mobile Telecommunications System
URLLC Ultra-Reliable and Low-Latency Communication
UTRAN Universal Mobile Telecommunications System Terrestrial Radio Access Network
WLAN Wireless Local Area Network

The invention claimed is:

1. An apparatus comprising:

at least one processor; and at least one memory storing instructions that, when executed by the at least one processor, cause the apparatus at least to perform:

receiving a first downlink control information comprising scheduling information associated with at least one of a downlink data channel or an uplink data channel from a network entity;

storing the scheduling information;

receiving a second downlink control information;

based upon the second downlink control information, at least one of:

receiving the downlink data channel based on the stored scheduling information; or transmitting the uplink data channel based on the stored scheduling information; and transmitting a grant update request using uplink control information carried on physical uplink control channel.

2. The apparatus of claim 1, wherein the apparatus is further caused to perform:

receiving at least one radio resource control message comprising at least one indication of whether the first downlink control information transmission would activate a first reporting if the first downlink control information follows one-bit downlink control information and the first downlink control information is configured for retransmission.

3. The apparatus of claim 2, wherein the apparatus is further caused to perform:

upon receiving the second downlink control information, stopping the first reporting, wherein the first reporting configured by radio resource control, enabled by medium access control element or indicated in the first downlink control information.

4. The apparatus of claim 2, wherein the first reporting can be configured by higher layer signalling together with the second downlink control information when the second downlink control information is configured.

5. The apparatus of claim 2, wherein the first reporting comprises at least one of user equipment channel related report, buffer status related report, user equipment power and battery related reporting, channel quality indicator, rank indicator, precoding matrix indicator, power head room report, or buffer state information.

6. The apparatus of claim 1, wherein one bit of the second downlink control information indicates whether the second downlink control information applies to receiving the downlink data channel or transmitting the uplink data channel.

7. The apparatus of claim 6, wherein the one bit of the second downlink control information comprises an indication of receiving new data in the resources assigned by the grant indicated in the first downlink control information.

8. The apparatus of claim 6, wherein the one bit of the second downlink control information comprises an indication of no adjustment of transmit power.

9. The apparatus of claim 1, wherein the apparatus is further caused to perform:

upon receiving the second downlink control information, reporting a second reporting according to an extended cycle configuration.

10. A method, comprising:

receiving, by a user equipment, a first downlink control information comprising scheduling information associated with at least one of a downlink data channel or an uplink data channel from a network entity;

storing, by the user equipment, the scheduling information;

receiving, by the user equipment, a second downlink control information;

based upon the second downlink control information, at least one of:

receiving, by the user equipment, the downlink data channel based on the stored scheduling information; or transmitting, by the user equipment, the uplink data channel based on the stored scheduling information; and transmitting, by the user equipment, a grant update request using uplink control information carried on physical uplink control channel.

11. The method of claim 10, further comprising:

receiving, by the user equipment, at least one radio resource control message comprising at least one indication of whether the first downlink control information transmission would activate a first reporting if the first downlink control information follows one-bit downlink control information and the first downlink control information is configured for retransmission.

12. The method of claim 10, wherein one bit of the second downlink control information indicates whether the second downlink control information applies to receiving the downlink data channel or transmitting the uplink data channel.

13. The method of claim 12, wherein the one bit of the second downlink control information comprises an indication of receiving new data in the resources assigned by the grant indicated in the first downlink control information.

14. The method of claim 11, further comprising:

wherein upon receiving the second downlink control information, stopping the first reporting, wherein the first reporting configured by radio resource control, enabled by medium access control element or indicated in the first downlink control information.

15. The method of claim 11, wherein the first reporting can be configured by higher layer signalling together with the second downlink control information when the second downlink control information is configured.

16. The method of claim 11, wherein the first reporting comprises at least one of user equipment channel related report, buffer status related report, user equipment power and battery related reporting, channel quality indicator, rank indicator, precoding matrix indicator, power head room report, or buffer state information.

17. The method of claim 10, further comprising:

wherein upon receiving the second downlink control information, reporting, by the user equipment, a second reporting according to an extended cycle configuration.

18. A non-transitory computer readable medium comprising instructions stored thereon for performing at least the following:

receiving, by a user equipment, a first downlink control information comprising scheduling information associated with at least one of a downlink data channel or an uplink data channel from a network entity;

storing, by the user equipment, the scheduling information;

receiving, by the user equipment, a second downlink control information;

based upon the second downlink control information, at least one of:

receiving, by the user equipment, the downlink data channel based on the stored scheduling information; or transmitting, by the user equipment, the uplink data channel based on the stored scheduling information; and transmitting, by the user equipment, a grant update request using uplink control information carried on physical uplink control channel.

19. The non-transitory computer readable medium of claim 18, wherein one bit of the second downlink control information indicates whether the second downlink control information applies to receiving the downlink data channel or transmitting the uplink data channel.

20. The non-transitory computer readable medium of claim 18, wherein the instructions stored thereon for further performing by the user equipment:

upon receiving the second downlink control information, reporting a second reporting according to an extended cycle configuration.

* * * * *